US010961930B2

(12) United States Patent
Szczepanski

(10) Patent No.: US 10,961,930 B2
(45) Date of Patent: Mar. 30, 2021

(54) CONTROL SYSTEM FOR VARIABLE DISPLACEMENT ENGINE

(71) Applicant: DENSO International America, Inc., Southfield, MI (US)

(72) Inventor: Edward Szczepanski, Grosse Pointe Woods, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 63 days.

(21) Appl. No.: 16/218,098

(22) Filed: Dec. 12, 2018

(65) Prior Publication Data

US 2020/0191075 A1    Jun. 18, 2020

(51) Int. Cl.
| | | |
|---|---|---|
| F02D 41/00 | (2006.01) | |
| F02D 13/06 | (2006.01) | |
| F01N 11/00 | (2006.01) | |
| F02D 41/22 | (2006.01) | |
| G01M 15/10 | (2006.01) | |
| F02D 41/14 | (2006.01) | |

(52) U.S. Cl.
CPC ........ F02D 41/0085 (2013.01); F01N 11/007 (2013.01); F02D 13/06 (2013.01); F02D 41/0087 (2013.01); F02D 41/1466 (2013.01); F02D 41/22 (2013.01); G01M 15/104 (2013.01); F01N 2430/02 (2013.01); F02D 2041/228 (2013.01)

(58) Field of Classification Search
CPC ...... F02D 13/06; F02D 17/02; F02D 41/0085; F02D 41/0087; F02D 41/21; F02D 41/22; F02D 41/227; F02D 41/228; F02D 2041/0012; F01N 11/007; F01N 2430/02; G01M 15/104
See application file for complete search history.

(56) References Cited

U.S. PATENT DOCUMENTS

| | | | | |
|---|---|---|---|---|
| 5,526,793 A | * | 6/1996 | Johansson | ............. F02B 77/085 |
| | | | | 123/198 D |
| 5,721,375 A | * | 2/1998 | Bidner | ................ F01L 13/0005 |
| | | | | 701/101 |
| 5,930,992 A | | 8/1999 | Esch et al. | |
| 6,922,986 B2 | | 8/2005 | Rozario | |
| (Continued) | | | | |

FOREIGN PATENT DOCUMENTS

| | | | | |
|---|---|---|---|---|
| DE | 102005049069 A1 | * | 4/2007 | ......... F02D 41/0087 |
| DE | 102011088843 A1 | * | 6/2013 | ......... F02D 41/0085 |
| WO | WO-2019238246 A1 | * | 12/2019 | ......... F02D 41/0085 |

*Primary Examiner* — John M Zaleskas
(74) *Attorney, Agent, or Firm* — Brooks Kushman P.C.

(57) ABSTRACT

A vehicle includes a variable displacement engine and a controller. The variable displacement engine has a plurality of cylinders and is configured to operate at a commanded air-fuel ratio. The controller is programmed to, in response to a command to perform a diagnostic test, operate the engine such that each of the cylinders is shut down for a portion of the diagnostic test while one or more of the remainder of the cylinders remain operating. The controller is further programmed to, in response to a deviation from the commanded air-fuel ratio exceeding a threshold while a first of the cylinders is shut down during the diagnostic test and a subsequent command to decrease the number of operating cylinders, shut down one or more of the plurality of cylinders other than the first of the cylinders.

20 Claims, 5 Drawing Sheets

(56) References Cited

U.S. PATENT DOCUMENTS

| | | |
|---|---|---|
| 7,007,457 B2 | 3/2006 | Ellmer |
| 7,677,027 B2 | 3/2010 | Iida et al. |
| 7,918,085 B2 | 4/2011 | Yoshioka |
| 9,200,587 B2 | 12/2015 | Serrano |
| 9,239,037 B2 | 1/2016 | Carlson et al. |
| 9,670,819 B2 | 6/2017 | Aoki et al. |
| 9,778,160 B2 | 10/2017 | Zhang |
| 9,790,867 B2 | 10/2017 | Carlson et al. |
| 9,891,137 B2 | 2/2018 | Chen et al. |
| 9,896,988 B2 | 2/2018 | Lee |
| 10,215,115 B1* | 2/2019 | Ranga .................. F02D 13/0223 |
| 10,323,562 B2 | 6/2019 | Van Nieuwstadt et al. |
| 2002/0069638 A1 | 6/2002 | Glugla et al. |
| 2002/0129597 A1 | 9/2002 | Glugla et al. |
| 2004/0098970 A1 | 5/2004 | Foster |
| 2004/0221832 A1* | 11/2004 | Takahashi ........... F02D 41/0087 |
| | | 123/339.15 |
| 2004/0255905 A1* | 12/2004 | Bauerle .................. F02D 17/02 |
| | | 123/396 |
| 2006/0053772 A1 | 3/2006 | Dou et al. |
| 2006/0243040 A1* | 11/2006 | Reed ......................... F01L 9/04 |
| | | 73/114.79 |
| 2007/0051092 A1* | 3/2007 | Pallett .................... F01N 11/002 |
| | | 60/276 |
| 2007/0051351 A1* | 3/2007 | Pallett ...................... F02D 17/02 |
| | | 123/692 |
| 2007/0240695 A1* | 10/2007 | Mitsuda .................. F02D 13/06 |
| | | 123/673 |
| 2008/0243362 A1* | 10/2008 | Mitsuda .................. F02D 13/06 |
| | | 701/103 |
| 2008/0312785 A1* | 12/2008 | Hartmann ............... F02D 17/02 |
| | | 701/29.1 |
| 2009/0094963 A1 | 4/2009 | Mizoguchi et al. |
| 2009/0118985 A1* | 5/2009 | Whitney ............. F02D 41/0087 |
| | | 701/105 |
| 2009/0306846 A1* | 12/2009 | Jeong ...................... F02D 17/02 |
| | | 701/31.4 |
| 2010/0031738 A1* | 2/2010 | Feldkamp ........... G01M 15/042 |
| | | 73/114.79 |
| 2010/0154738 A1* | 6/2010 | Tsukamoto ............. F02D 17/02 |
| | | 123/198 F |
| 2010/0175462 A1* | 7/2010 | Doering .................. F01L 13/00 |
| | | 73/114.31 |
| 2010/0175463 A1* | 7/2010 | Doering .................. F02D 13/06 |
| | | 73/114.37 |
| 2010/0198483 A1* | 8/2010 | Adachi ............... F02D 41/0087 |
| | | 701/103 |
| 2010/0288037 A1* | 11/2010 | Gibson ..................... F01L 1/34 |
| | | 73/114.79 |
| 2011/0276250 A1* | 11/2011 | Sano .................... F02D 41/0087 |
| | | 701/103 |
| 2012/0173122 A1* | 7/2012 | Nishikiori ................. F02D 9/06 |
| | | 701/103 |
| 2014/0041630 A1 | 2/2014 | Carlson et al. |
| 2014/0163841 A1* | 6/2014 | Sane .................... F02D 41/0087 |
| | | 701/104 |
| 2014/0261309 A1* | 9/2014 | Chen .................... F02D 41/0082 |
| | | 123/320 |
| 2014/0360477 A1* | 12/2014 | Doering ................ F02D 41/144 |
| | | 123/673 |
| 2014/0366835 A1* | 12/2014 | Walter ................ F02D 41/0087 |
| | | 123/294 |
| 2015/0051816 A1 | 2/2015 | Glugla et al. |
| 2015/0369155 A1 | 12/2015 | Ueda |
| 2016/0061127 A1* | 3/2016 | Chen .................... F02D 41/0082 |
| | | 123/673 |
| 2016/0115879 A1 | 4/2016 | Lehmen et al. |
| 2016/0115884 A1 | 4/2016 | VanDerWege et al. |
| 2016/0195031 A1 | 7/2016 | Willems et al. |
| 2016/0222899 A1 | 8/2016 | Glugla |
| 2016/0258375 A1* | 9/2016 | Jammoussi ........... F02D 41/222 |
| 2016/0258376 A1* | 9/2016 | Jammoussi ......... F02D 41/0087 |
| 2016/0333809 A1* | 11/2016 | Jammoussi ......... F02D 41/1497 |
| 2017/0321587 A1 | 11/2017 | Marlett et al. |
| 2017/0350332 A1* | 12/2017 | Martin ................ F02D 41/0087 |
| 2017/0356353 A1* | 12/2017 | Rollinger ................ F02D 13/06 |
| 2017/0356362 A1* | 12/2017 | Macewen ............ F02D 41/009 |
| 2017/0356363 A1* | 12/2017 | Jammoussi ......... F02D 41/1444 |
| 2017/0356368 A1* | 12/2017 | Richards ............ F02D 41/0087 |
| 2017/0356370 A1* | 12/2017 | Doering .................. F02D 13/06 |
| 2017/0356374 A1* | 12/2017 | Rollinger ............ F02D 41/3005 |
| 2017/0356380 A1* | 12/2017 | Surnilla ............... F02D 41/2454 |
| 2018/0080398 A1* | 3/2018 | Leone ..................... F02D 13/06 |
| 2018/0216562 A1* | 8/2018 | Dudar ..................... F02D 13/06 |
| 2018/0230914 A1* | 8/2018 | McCarthy, Jr. ...... F02D 41/0007 |
| 2018/0274471 A1* | 9/2018 | Dudar ................. G01M 15/042 |
| 2019/0033170 A1* | 1/2019 | Dudar ................. G01M 15/106 |
| 2019/0186401 A1* | 6/2019 | Dudar ................. F02D 41/0087 |
| 2019/0218989 A1* | 7/2019 | Dudar ..................... F02D 13/06 |
| 2019/0264628 A1* | 8/2019 | Dudar .................... F02D 41/042 |
| 2019/0271265 A1* | 9/2019 | Iannone ............. F02D 13/0257 |
| 2019/0339164 A1* | 11/2019 | Kupiec ................ F02D 41/1497 |
| 2019/0390610 A1* | 12/2019 | Ulstad .................. F02D 41/062 |

\* cited by examiner

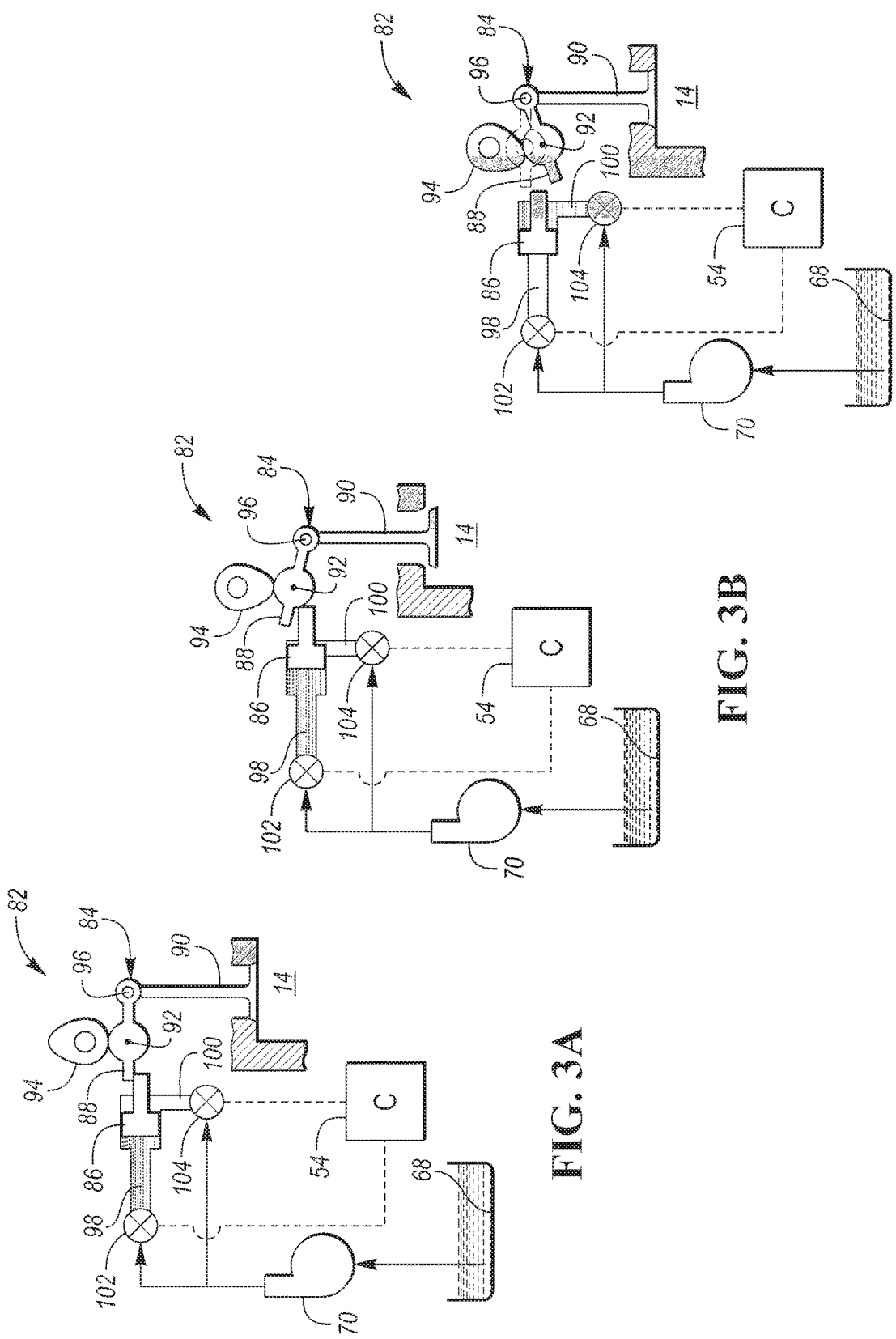

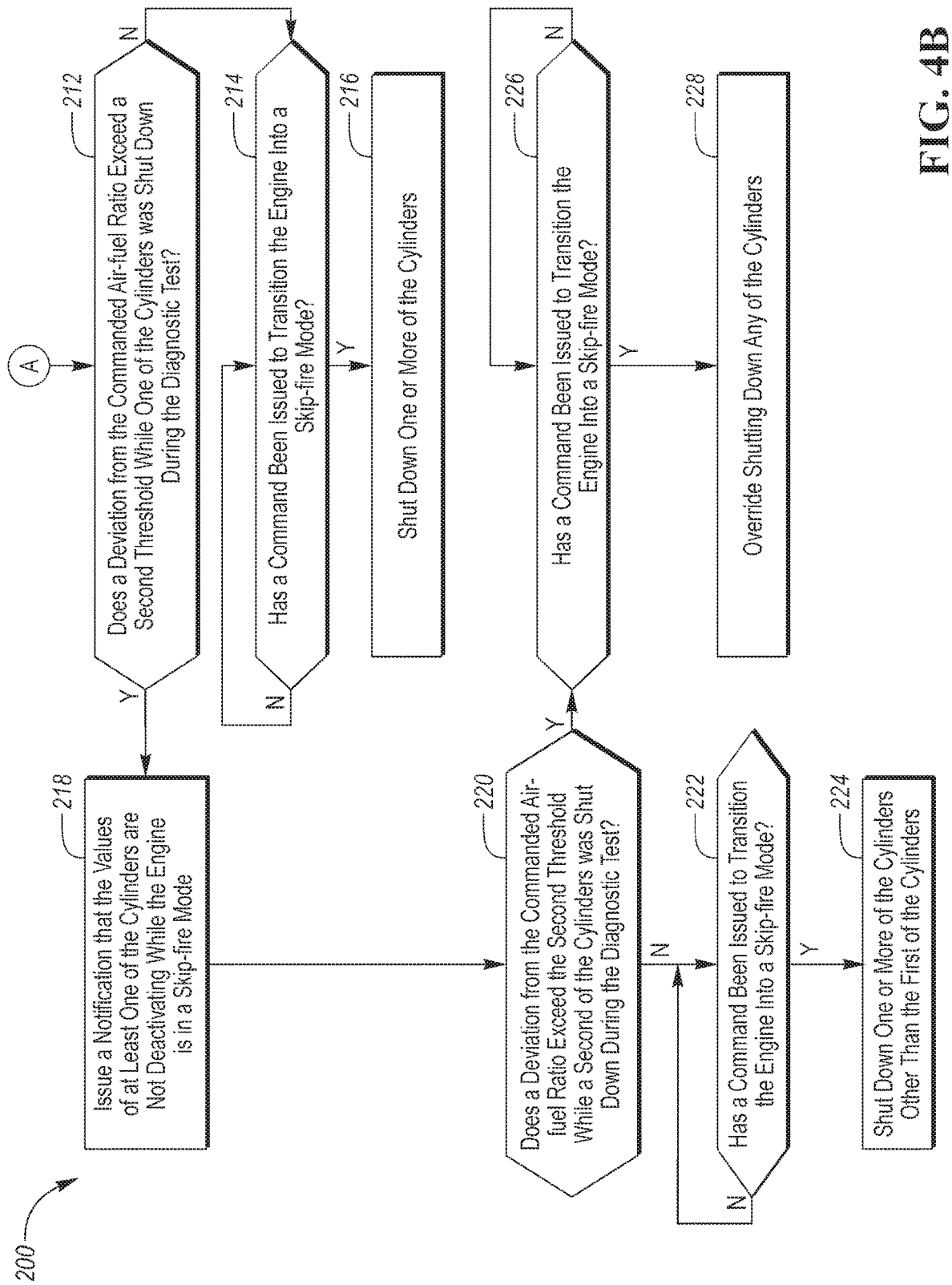

CONTROL SYSTEM FOR VARIABLE DISPLACEMENT ENGINE

TECHNICAL FIELD

The present disclosure relates to control systems for variable displacement or skip-fire internal combustion engines.

BACKGROUND

One or more cylinders in a variable displacement internal combustion engine may be shut down or deactivated while the engine is operating, which results in the engine being powered by less than all the cylinders.

SUMMARY

A vehicle includes a variable displacement engine and a controller. The variable displacement engine has a plurality of cylinders and is configured to operate at a commanded air-fuel ratio. The controller is programmed to, in response to a command to perform a diagnostic test, operate the engine such that each of the cylinders is shut down for a portion of the diagnostic test while one or more of the remainder of the cylinders remain operating. The controller is further programmed to, in response to a deviation from the commanded air-fuel ratio exceeding a threshold while a first of the cylinders is shut down during the diagnostic test and a subsequent command to decrease the number of operating cylinders, shut down one or more of the plurality of cylinders other than the first of the cylinders.

A method of operating a vehicle engine having a plurality of cylinders includes operating the engine during a diagnostic test such that each of the cylinders is shut down for a portion of the diagnostic test while one or more of the remainder of the cylinders remain operating. The method further includes, in response to a deviation from a commanded air-fuel ratio exceeding a threshold while a first of the cylinders is shut down during the diagnostic test and a subsequent command to decrease the number of operating cylinders, shutting down one or more of the plurality of cylinders other than the first of the cylinders.

A vehicle includes an engine and a controller. The engine has a plurality cylinders and is configured to operate at a commanded air-fuel ratio. The controller is programmed to, in response to a command to perform a diagnostic test, operate the engine such that each of the cylinders is shut down for a portion of the diagnostic test while one or more of the remainder of the cylinders remain operating. The controller is further programmed to, in response to a deviation from the commanded air-fuel ratio exceeding a threshold while a first of the cylinders is shut down during the diagnostic test and a subsequent command to operate the engine in a skip-fire mode, shut down one or more of the plurality of cylinders other than the first of the cylinders.

BRIEF DESCRIPTION OF THE DRAWINGS

FIGS. 3A-3C illustrate a mechanism that is configured to disable the valves in a variable displacement engine; and FIGS. 4A and 4B represent a flowchart illustrating a control method for controlling a variable displacement engine.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
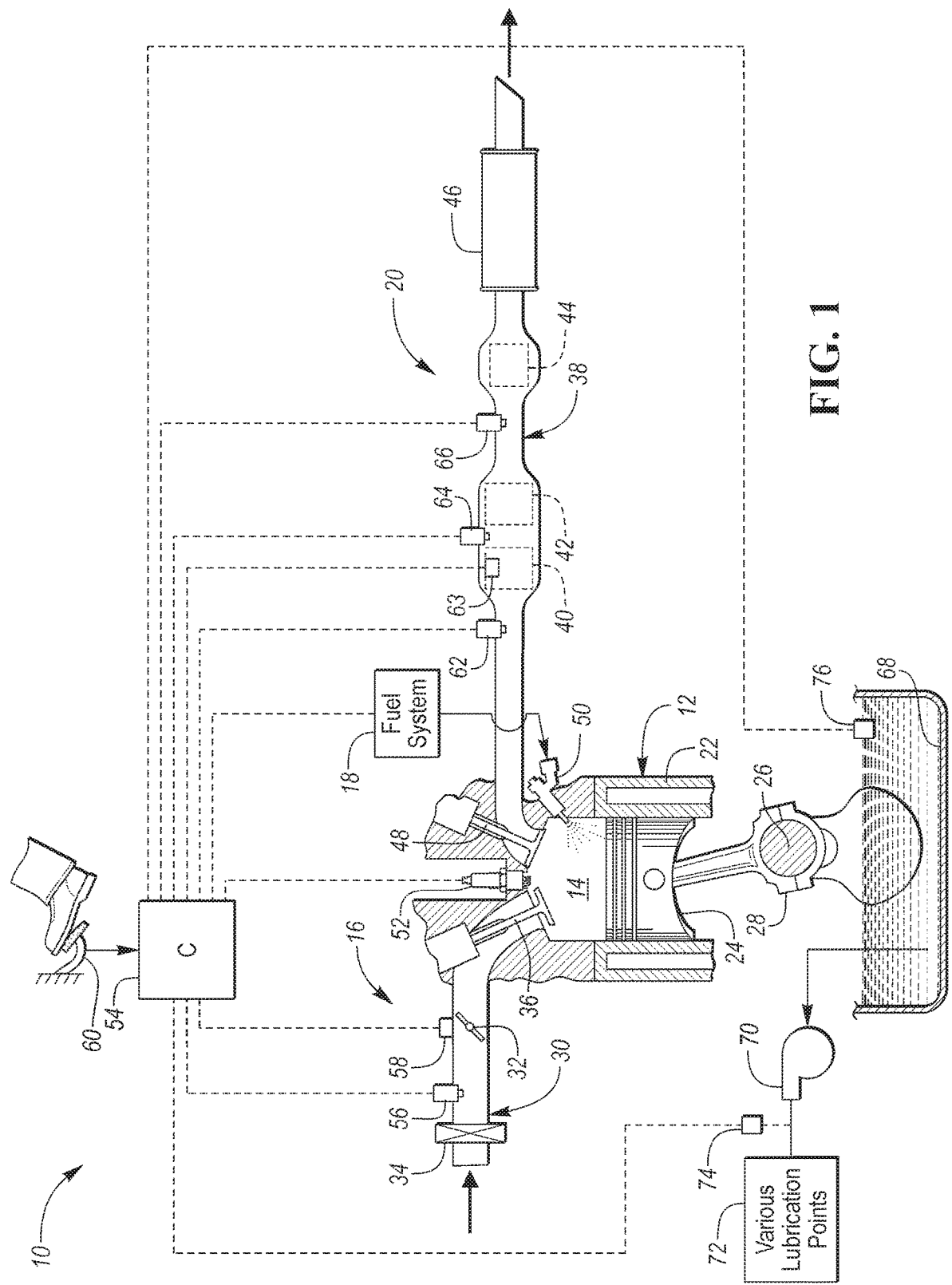
FIG. 1 is a schematic illustration of a vehicle including a single cylinder of an internal combustion engine that has multiple cylinders, an air intake system, a fuel delivery system, and an exhaust system.
Figure 2:
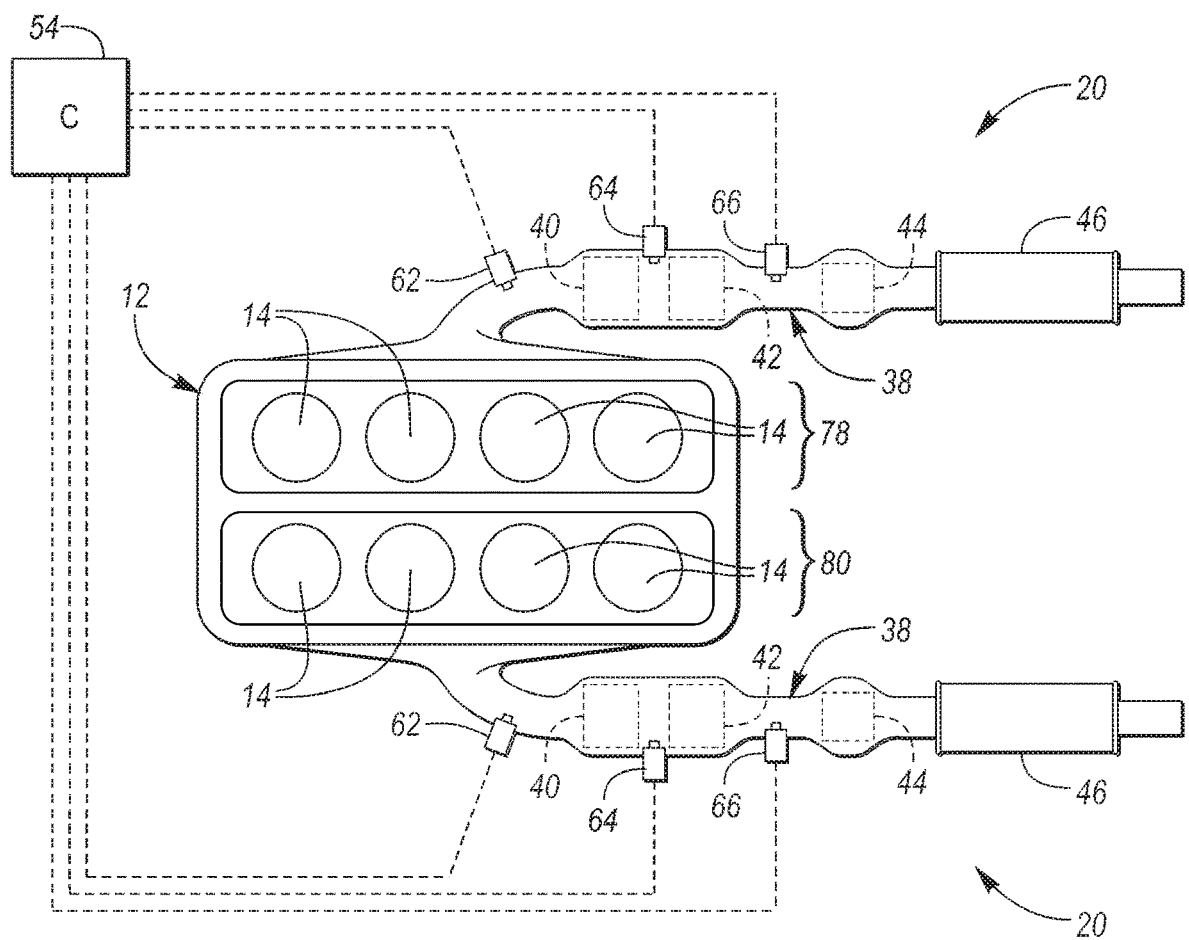
FIG. 2 is a schematic illustration of the multiple cylinders of the internal combustion engine and the exhaust system.

Referring to FIGS. 1 and 2, a vehicle 10 and an internal combustion engine 12 that includes multiple cylinders are illustrated. The schematic of FIG. 1 illustrates a single cylinder 14 of the internal combustion engine 12, an air intake system 16, a fuel delivery system 18, and an exhaust system 20. The schematic of FIG. 2 illustrates the multiple cylinders 14 of the engine 12 and the exhaust system of the engine 12. It should be understood that the single cylinder 14 illustrated in FIG. 1 may be representative of one or all of the cylinders 14 of the engine 12. It should further be understood, that the air intake system 16 and fuel delivery system 18 illustrated in FIG. 1 are representative of the systems that deliver air and fuel, respectively, to all of the cylinders 14 of the engine 12, while the exhaust system 20 illustrated in FIG. 1 is representative of the system that channels exhaust gas away from all of the cylinders 14 of the engine 12.

The engine 12 includes an engine block 22 that defines each of the cylinders 14. A piston 24 is disposed within each of the cylinders 14. The pistons 24 are configured to transfer the energy that results from combusting fuel within each cylinder 14 into kinetic energy, which is utilized to rotate a crankshaft 26. Each piston 24 is connected to the crankshaft 26 via a connecting rod 28. The crankshaft 26 then transfers the rotational energy to one or more drive wheels (not shown) of the vehicle 10 in order to propel the vehicle 10. Intermediate components, such as driveshafts, a torque converter, a transmission gearbox, universal joints, differentials, etc. may be disposed between the crankshaft 26 and the drive wheels. The intermediate components are configured to transfer the rotational power of the crankshaft 26 to the drive wheels.

The air intake system 16 includes one or more manifolds, pipes, ducts, or conduits 30 that are configured to channel air from the ambient surroundings and into the cylinders 14. The amount of air that is being channeled into the cylinders 14 may be controlled by the throttle valve 32. An air filter 34 may be disposed proximate to the intake of the air intake system 16. Each of the cylinders 14 includes an air intake valve 36 is that is configured to establish fluid communication between the cylinder 14 and the air intake system 16 when in an opened position and isolate the cylinder 14 from the air intake system 16 when in a closed position. The air intake valve 36 of each cylinder 14 will be in an opened position during the intake stroke of the respective piston 24 and closed during the compression, combustion, and exhaust strokes of the respective piston 24.

The exhaust system 20 includes one or more manifolds, pipes, ducts, or conduits 38 there configured to channel exhaust gas away from the cylinders 14 and to the ambient surroundings. The exhaust system 20 includes a first catalyst 40 (or first catalytic converter) that is configured to reduce the amount of emissions (e.g., $NO_x$ gases or unspent hydrocarbons) in the exhaust gas that is channeled to the ambient air or surroundings. The exhaust system 20 may include a second catalyst 42 (or second catalytic converter) that is configured to further reduce the amount of emissions in the exhaust gas that are channeled to the ambient air or surroundings. The second catalyst 42 may be a redundant catalyst that only further reduces the emissions in the exhaust when the first catalyst 40 is not operating at full capacity or has some malfunction. The exhaust system 20 may further include a particulate filter 44 that is configured to reduce particulate matter in the exhaust and a muffler 46 that is configured to reduce noise. The particulate filter 44 and the muffler 46 may each be downstream of the first catalyst 40 and the second catalyst 42. Each of the cylinders 14 includes an exhaust valve 48 is that is configured to establish fluid communication between the cylinder 14 and the exhaust system 20 when in an opened position and isolate the cylinder 14 from the exhaust system 20 when in a closed position. The exhaust valve 48 of each cylinder 14 will be in an opened position during the exhaust stroke of the respective piston 24 and closed during the intake, compression, and combustion strokes of the respective piston 24.

One or more camshafts (not shown) may be configured to open and close the air intake valve 36 and exhaust valve 48 of each cylinder 14. The camshafts may be connected to the crankshaft 26 by a gearing arrangement, belted arrangement, or some other arrangement to ensure that the air intake valves 36 and exhaust valves 48 are opening and closing when necessary. More specifically, the connection between the crankshaft 26 and the one or more camshafts will ensure that the air intake valve 36 of each cylinder 14 is in the opened position during the intake stroke of the respective piston 24 and closed during the compression, combustion, and exhaust strokes of the respective piston 24. The connection between the crankshaft 26 and the one or more camshafts will also ensure that the exhaust valve 48 of each cylinder 14 is in the opened position during the exhaust stroke of the respective piston 24 and closed during the intake, compression, and combustion strokes of the respective piston 24.

The first catalyst 40 and second catalyst 42 each may consist of a brick that is coated in alumina. The alumina in turn is coated with rhodium, cerium, and platinum or palladium. The rhodium is configured to reduce the amount NOx gases (combinations of nitrogen and oxygen such NO, NO2, etc.) that are present within the exhaust. More specifically, the rhodium is configured to convert the NOx gases into nitrogen (N2) and oxygen (O2) by reacting the NOx gases with oxygen. The platinum or palladium is configured to reduce the amount of unspent hydrocarbons (e.g., C8H18 or C1H4) that are present within the exhaust. More specifically, the platinum or palladium is configured to convert the hydrocarbons into carbon dioxide (CO2) and water (H2O) by reacting the hydrocarbons with oxygen. The rhodium may also reduce the amount of unspent hydrocarbons within the exhaust, however, the rhodium is primarily utilized to reduce the amount of amount NOx gases that are present within the exhaust. The platinum or palladium may also reduce the amount of amount NOx gases that are present within the exhaust, however, the platinum or palladium is primarily utilized to reduce the amount of unspent hydrocarbons that are present within the exhaust. The cerium acts to store oxygen, which is then supplied to the rhodium and the platinum or palladium to effect the reactions described above to convert NOx gases into nitrogen (N2) and oxygen (O2) and to convert the unspent hydrocarbons into carbon dioxide (CO2) and water (H2O).

The particulate filter 44 is configured to filter any particulate matter out of the exhaust gas in order to prevent the particulate matter from being channeled to the ambient air or surroundings. Particulate matter may refer to any particle within the exhaust guest including rust, oil mixed with any solid material (e.g., metal shavings), simply oil by itself, carbon particles, suspended particulate matter (SPM), thoracic and respirable particles, inhalable coarse particles, which are coarse particles with a diameter between 2.5 and 10 micrometers (μm), fine particles with a diameter of 2.5 μm or less, ultrafine particles, soot (i.e., a mass of impure carbon particles resulting from the incomplete combustion of hydrocarbons), etc.

The fuel delivery system 18 is configured to deliver fuel to each of the cylinders 14. More specifically, the fuel delivery system may include a fuel tank for storing fuel, conduits that establish fluid communication between the fuel tank and fuel injectors 50, and a fuel pump that is configured to direct the fuel from the fuel tank, through the conduits, and to each of the fuel injectors 50. Each cylinder 14 also includes a spark plug 52 that is configured to ignite the air and fuel mixture that is within the cylinder 14 and push down on the respective piston 24 during the power stroke of the cylinder 14.

The vehicle 10 includes a controller 54, which may be a powertrain control unit (PCU). While illustrated as one controller, the controller 54 may be part of a larger control system and may be controlled by various other controllers throughout the vehicle 10, such as a vehicle system controller (VSC). It should therefore be understood that the controller 54 and one or more other controllers can collectively be referred to as a "controller" that controls various components of the vehicle 10 in response to signals from various sensors to control functions such as, shutting down one or more of the cylinders 14 of the engine 12 during a skip-fire mode, selecting or scheduling shifts of a vehicle transmission, adjusting the air-fuel mixture being delivered to the engine 12, etc.

The controller 54 may include a microprocessor or central processing unit (CPU) that is in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 in controlling the engine 12 or subcomponents of the vehicle 10.

The controller 54 may be configured to increase or decrease the power output of the engine 12. More specifically, the controller 54 may be configured to increase or decrease the power output of the engine 12 by increasing or decreasing the airflow and fuel flow into each cylinder 14. The airflow may be increased by adjusting the throttle valve 32 towards a fully open position or decreased by adjusting the throttle valve towards a fully closed position. The fuel flow may be increased by opening the fuel injectors 50 for longer periods of time during each injection of fuel into the cylinder 14 or decreased by opening the fuel injectors 50 for shorter periods of time during each injection of fuel into the cylinder 14. The controller 54 may also increase or decrease the power output of the engine 12 by either retarding or advancing the spark timing of the spark plugs 52.

A mass airflow sensor 56 may be configured to measure the amount of air flowing into the air intake system 16, which is eventually delivered to the cylinders 14, and communicate the amount of air flowing into the air intake system 16 to the controller 54. A throttle position sensor 58 may be configured to communicate the position of the throttle valve 32 to the controller 54. The controller 54 may also be in communication with each of the spark plugs 52, the fuel system 18, and each of the fuel injectors 50. Based on a power demand that is delivered to the controller 54, the controller may adjust the throttle valve 32 position to increase or decrease airflow into the cylinders 14, adjust the timing of the spark plugs 52, and/or adjust the amount of fuel being delivered into the cylinders 14 to either increase or decrease the power output of the engine 12 to meet the power demand. The power demand may be input into the controller 54 by an operator of the vehicle 10 when the operator engages an accelerator pedal 60. Under certain circumstances the power demand may be based on a presetting that is stored as control logic within the controller 54. For example, if the vehicle operator is not depressing the accelerator pedal 60 and the engine 12 is on, the amount of power the engine 12 is producing may be adjusted to a preset idle value.

Also, depending on power demand or for emission control purposes, the engine 12 may be configured to operate at a stoichiometric air-fuel mass ratio, a lean air-fuel mass ratio, or a rich air-fuel mass ratio. The air-fuel mass ratio may simply be referred to as the air-fuel ratio. Stoichiometric air-fuel mass ratio has a value of 14.7 to 1. A rich air-fuel mass ratio will be less than 14.7 to 1 and a lean air-fuel mass ration will be greater than 14.7 to 1. An air-fuel equivalence ratio ($\lambda$) has an air-fuel mass ratio that is stoichiometric when $\lambda$ is equal to 1, an air-fuel mass ratio that is rich when $\lambda$ is less than 1, and an air-fuel mass ratio that is lean when $\lambda$ is greater than 1. The air-fuel mass ratio may be controlled, via the controller 54, by adjusting the amount of air and fuel flowing into the cylinders 14.

A first lambda or oxygen sensor 62 may be disposed within the conduits 38 of the exhaust system 20 between the cylinders 14 and the first catalyst 40. The first oxygen sensor 62 may be a universal heated exhaust gas oxygen sensor. The first oxygen sensor 62 is configured to measure the amount of oxygen ($O_2$) that is within the exhaust gas exiting the cylinder 14. Based on the measured amount oxygen in the exhaust gas, the first oxygen sensor 62 generates a signal (e.g., a voltage or current) that correlates with the current air-fuel equivalence ratio ($\lambda$) that the engine 12 is operating at. The signal generated by the first oxygen sensor 62 may indicative of a lean, stoichiometric, or rich current air-fuel equivalence ratio ($\lambda$). The first oxygen sensor 62 communicates the air-fuel ratio or air-fuel equivalence ratio ($\lambda$) measurement to the controller 54, which provides a feedback control to the controller 54. The feedback control may include adjusting the air and/or fuel flowing (i.e., flow rates) into the cylinders 14 via the controller 54 if the air-fuel equivalence ratio ($\lambda$) measured by the first oxygen sensor 62 is different than the air-fuel equivalence ratio ($\lambda$) that is being commanded to the engine 12. More specifically, the feedback control may include adjusting the air and/or fuel flowing into the cylinders 14 to drive the air-fuel equivalence ratio ($\lambda$) that is being measured by the first oxygen sensor 62 toward the air-fuel equivalence ratio ($\lambda$) that is being commanded to the engine 12.

A second lambda or oxygen sensor 64, which has the same functionality as the first oxygen sensor 62, may be disposed within the conduits 38 of the exhaust system 20 between the first catalyst 40 and the second catalyst 42. The second oxygen sensor 64 is utilized to determine the efficiency at which the first catalyst 40 reduces the amount of emissions within the exhaust gas. The second oxygen sensor 64 is configured to communicate a signal that correlates with the measured air-fuel equivalence ratio ($\lambda$) of the exhaust gas back to the controller 54, after the exhaust gas has passed through the first catalyst 40. A particulate sensor 66 may be disposed within the conduits 38 of the exhaust system 20 between the second catalyst 42 and the particulate filter 44. The particulate sensor 66 is configured to measure the amount of particulate matter within the exhaust gas and communicate the measurement to the controller 54 in the form of a signal (e.g., a voltage or current).

One or more temperature sensors 63 may configured to measure the temperature of the first catalyst 40 and/or the second catalyst 42. The temperature sensors 63 are configured to communicate a signal (e.g., a voltage or current) that correlates with a measured temperature of the first catalyst 40 and/or the second catalyst 42 back to the controller 54.

The engine 12 also includes an oil pan or sump 68. An oil pump 70 is configured to direct oil out of the sump 68 and towards various lubrication points 72, such as any of the bearings, journals, valve stems, or any of the other moving parts within the engine 12. A pressure sensor 74 may be configured to measure the pressure of the oil that is being output from the oil pump 70. The pressure sensor 74 may then communicate the oil pressure to the controller 54. An oil level sensor 76 may be configured to measure the level of the oil within the pan or sump 68. The oil level sensor 76 may then communicate the level of the oil to the controller 54.

Referring to FIG. 2, the engine 12 is illustrated as an eight-cylinder engine that includes a first bank 78 of four cylinders 14 and a second bank 80 of four cylinders 14. The first bank 78 of cylinders includes an exhaust system 20 that is configured to channel the exhaust gas away from the first bank 78 of cylinders only. The second bank 80 of cylinders includes an exhaust system 20 that is configured to channel the exhaust gas away from the second bank 80 of cylinders only. Although FIG. 2 illustrates an eight-cylinder engine that includes two banks of cylinders where each bank has its own exhaust system 20, it should be understood that the engine 12 may include two or more cylinders that comprise of one or more banks of cylinders where each bank of cylinders may include a separate exhaust system.

The engine 12 may be a variable displacement engine or a skip-fire engine that may be controlled to shut down or deactivate one or more cylinders 14 while the engine 12 is operating, resulting in the engine 12 being powered by less than all the cylinders 14. Shutting down or deactivating a specific cylinder 14 a during skip-fire mode requires shutting down or deactivating the air intake valve 36, exhaust valve 48, spark plug 52, and the fuel injector 50. The engine 12 may be referred to as operating in a skip-fire mode when being powered by less than all of the cylinders 14. The cylinders 14 may be shut down or deactivated in any known pattern to increase the fuel efficiency when conditions are such that the engine 12 may effectively operate in the skip-fire mode to increase fuel efficiency without disturbing the driving requirements of the vehicle operator (e.g., when the number of cylinders can be reduced without reducing the speed of the vehicle). However, it may be desirable to shut down or deactivate the cylinders 14 based on the position of the cylinders 14 in order to directionally equalize the forces that are being transferred to the crankshaft 26 from the pistons 24. Furthermore, which of the cylinders 14 are shut down or deactivated and which of the cylinders 14 are operating may always be changing or rotating when in the skip-fire mode, which may also help to directionally equalize the forces that are being transferred to the crankshaft 26 from the pistons 24.

Referring to FIGS. 3A-3C a mechanism 82 that is configured to deactivate the air intake valves 36 and exhaust valves 48 in the variable displacement/skip-fire engine 12 is illustrated. During a skip-fire mode, if a particular cylinder 14 is shut down or deactivated, both the air intake valve 36 and the exhaust valve 48 of that particular cylinder 14 will also be deactivated (i.e., the air intake valve 36 and exhaust valve 48 will be in closed positions and disabled from transitioning to opened positions). The mechanism 82 includes a deactivation arm 84 and a locking pin 86. The locking pin 86 is configured to advance and engage a protrusion 88 that extends outward from the deactivation arm 84. The locking pin 86 is also configured to retract and disengage from the protrusion 88 that extends outward from the deactivation arm 84. A stem valve 90 is secured to an opposing side of the deactivation arm 84 relative to the protrusion 88. The stem valve 90 may be representative of both the air intake valves 36 and the exhaust valves 48.

The deactivation arm 84 will rotate about a first pivot 92 when engaged by a camshaft 94 while the locking pin 86 is engaging the protrusion 88. Rotation of the deactivation arm 84 about the first pivot 92 allows the stem valve 90 to transition between a closed position (see FIG. 3A) and an opened position (see FIG. 3B). The stem valve 90 as depicted in FIGS. 3A and 3B has not been deactivated (i.e., the stem valve 90 will transition between the opened and closed positions in response to rotation of the camshaft 94). The deactivation arm 84 will rotate about a second pivot 96, which rotatably secures the deactivation arm 84 to the stem valve 90, when engaged by the camshaft 94 while the locking pin 86 is disengaged from the protrusion 88. Rotation of the deactivation arm 84 about the second pivot 96 results in the stem valve 90 remaining in the closed position regardless of the position of the camshaft 94 and the position of the deactivation arm 84 (see FIG. 3C). The stem valve 90 as depicted in FIG. 3C has been deactivated (i.e., the stem valve 90 will remain in the closed position and will not transition between the opened and closed positions in response to engagement between the deactivation arm and the camshaft 94).

The locking pin 86 may be advanced and retracted by a pressurized fluid. The oil pump 70 may be configured to deliver pressurized oil to a first chamber 98 that is located on a first side of the locking pin 86 in order to advance the locking pin 86 such that the locking pin 86 engages the protrusion 88. The oil pump 70 may also be configured to deliver pressurized oil to a second chamber 100 that is located on a second side of the locking pin 86 in order to retract the locking pin 86 such that the locking pin 86 disengages from the protrusion 88. A first fluid valve 102 may be disposed within a conduit between the oil pump 70 and the first chamber 98. A second valve 104 may be disposed within a conduit between the oil pump in the second chamber 100. The pressurized fluid is delivered to the first chamber 98 when the first valve 102 is open and the second valve 104 is closed. The pressurized fluid is delivered to the second chamber 100 and when the first valve 102 is closed and the second valve 104 is open. When the first valve 102 is opened and the second valve 104 is closed, the locking pin 86 is advanced (see FIGS. 3A and 3B) and the stem valve 90 may transition between the opened and closed positions (i.e., the stem valve 90 has not been deactivated). When the first valve 102 is closed and the second valve 104 is opened, the locking pin 86 is retracted (see FIG. 3C), the stem valve 90 remains in the closed position, and the stem valve 90 cannot transition to the opened position (i.e., the stem valve 90 has been deactivated).

The controller 54 may be configured to open and close the first valve 102 and the second valve 104 to either advance or retract the locking to pin 86 to respectivley activate or deactivate the stem valve 90. More specifically, the controller 54 may be configured to activate or deactivate the air intake valve 36 and the exhaust valve 48 of a particular cylinder 14 by utilizing the mechanism 82 depicted in FIGS. 3A-3C, depending on whether the engine 12 is operating in a mode where the particular cylinder 14 is activated or operating in a skip-fire mode that requires the particular cylinder 14 to be shut down or deactivated. When the air intake valve 36 and the exhaust valve 48 of a particular cylinder 14 are deactivated, the particular cylinder 14 is also deactivated. Each valve (air intake valve 36 and exhaust valve 48) for each cylinder 14 may include an associated mechanism 82 for disabling the particular valve. The mechanism 82 depicted in FIGS. 3A-3C is not intended to be limiting. The engine 12 may be a variable displacement/ skip-fire engine where the valves of a particular cylinder (and therefore the cylinder itself) may be deactivated by any method known in the art.

Figure 4A:
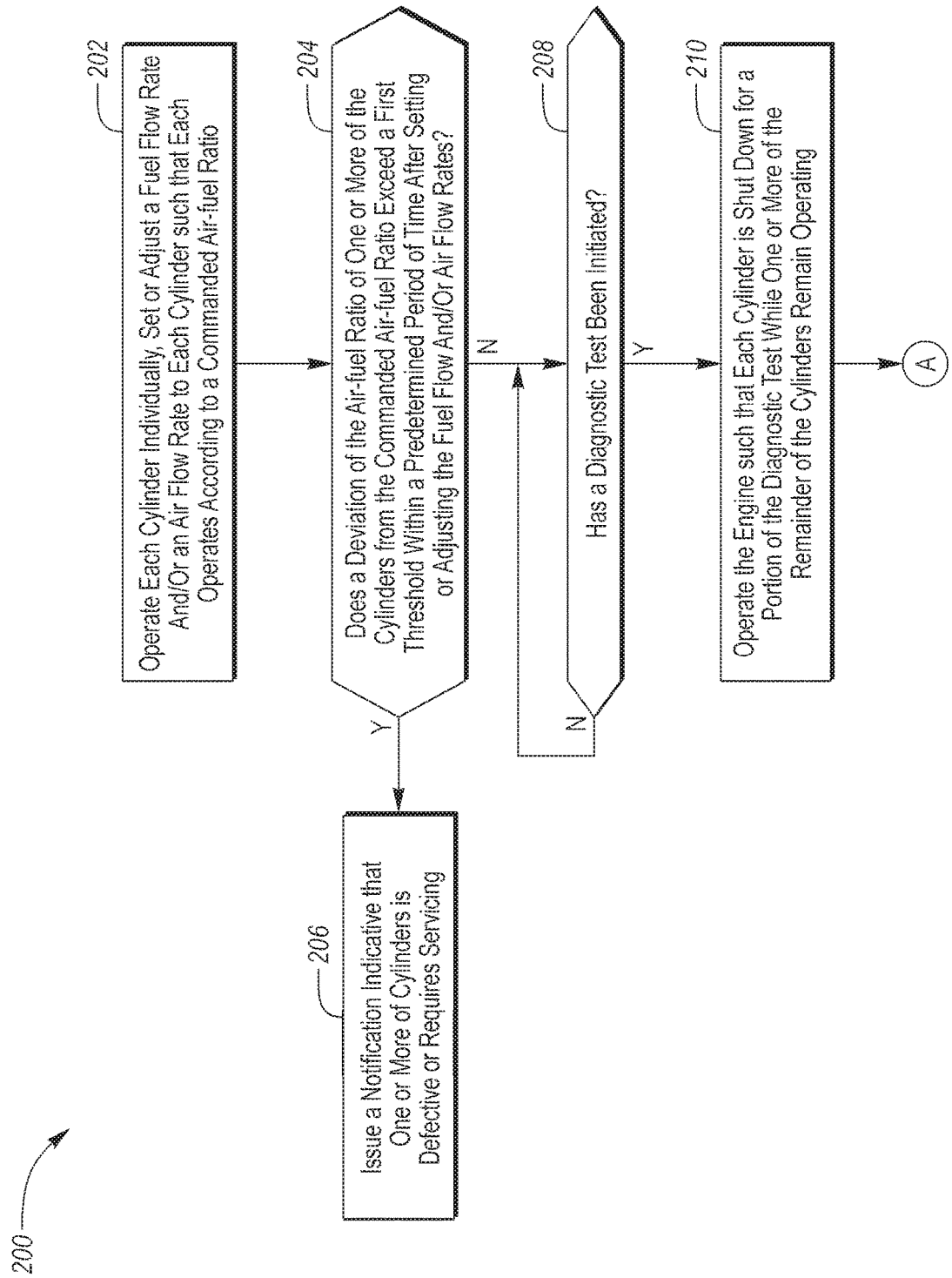

Referring to FIGS. 4A and 4B, a flowchart of a control method 200 for controlling the variable displacement or skip-fire internal combustion engine 12 is illustrated. The method 200 may be stored as control logic and/or an algorithm within the controller 54. The controller 54 may be programmed to implement the method 200 by controlling the various components of the vehicle 10. The engine 12 is configured to operate at a commanded air-fuel ratio (or commanded air-fuel equivalence ratio, $\lambda$). The commanded air-fuel ratio may change over a range of values, that includes a stoichiometric air-fuel mass ratio, lean air-fuel mass ratios, and rich air-fuel mass ratios, depending on the current power demand or for emission control purposes.

In a variable displacement or skip-fire engine, it is desirable that each of the cylinders also operate at the commanded air-fuel ratio (or commanded air-fuel equivalence ratio, $\lambda$) independently in order prevent the engine from deviating from the commanded air-fuel ratio once the engine has entered into the skip-fire mode and one or more of the cylinders have been shut down. For example, in a four-cylinder engine, two of the cylinders may operate at the commanded air-fuel ratio, one of the cylinders may operate at a slightly richer value, and one of the cylinders may operate in a slightly leaner value. The cylinder that operates at the slightly richer value may balance the cylinder that operates at the slightly leaner value resulting in the aggregate of the four cylinders operating at the commanded air-fuel ratio. If such an engine enters a skip-fire mode where either the cylinder that operates at the slightly richer value or the cylinder that operates at the slightly leaner value is shut down, the aggregate of the remaining three cylinders will fail to operate at the commanded air-fuel ratio.

The method 200 begins at block 202 where the controller 54 is programmed to operate each of the cylinders 14 of the engine 12 independently at a commanded air-fuel ratio. If the air-fuel ratio in the exhaust stream produced by a of a specific cylinder 14, which is measured in the form of the air-fuel equivalence ratio ($\lambda$) by the first lambda or oxygen sensor 62, match the commanded air-fuel ratio while the cylinder 14 is being operated independently, then the operating parameters (i.e., the fuel flow rate and/or airflow rate into the cylinder 14) of the specific cylinder 14 are set (i.e., stored within the controller 54) such that the cylinder 14 will operate at and in accordance with the commanded air-fuel ratio during subsequent operations. If the air-fuel ratio in the exhaust stream produced by a specific cylinder 14 does not match the commanded air-fuel ratio while the cylinder 14 is being operated independently, then the operating parameters (i.e., the fuel flow rate and/or airflow rate into the cylinder 14) of the specific cylinder 14 are adjusted and then set (i.e., stored within the controller 54) such that the cylinder 14 will operate at and in accordance with the commanded air-fuel ratio during subsequent operations. More specifically, each of the cylinders 14 of the engine 12 may be operated independently over a range of commanded air-fuel ratios that may be utilized during the operation of the engine 12, and then adjusted or set to operate at and in accordance with the commanded air-fuel ratios during subsequent operations. The range of commanded air-fuel ratios may include a stoichiometric air-fuel mass ratio, lean air-fuel mass ratios, and rich air-fuel mass ratios.

The measured air-fuel equivalence ratio ($\lambda$) values of each exhaust stream produced by each cylinder 14 may be recorded over several cycles of diagnostic testing and stored as data within the controller 54. The data may be stored over the lifetime of the engine 12 or may be stored for a predetermined period of time. If the amount of recorded deviation increases gradually over time, it is likely due to the normal wear and tear of the engine 12. On the other hand, if a sudden amount deviation in the air-fuel equivalence ratio ($\lambda$) occurs over a short period of time, that may be indicative of a problem that is beyond normal wear and tear, which may require servicing of the engine 12.

Once each of the cylinders 14 of the engine 12 has been operated independently and the fuel flow rate and/or airflow rate into the each of the cylinders 14 has been set at block 202 such that each cylinder 14 operates independently at the commanded air-fuel ratio, the method 200 moves on to block 204. At block 204, it is determined if a deviation of the air-fuel ratio of one of the cylinders 14 from the commanded air-fuel ratio exceeds a first threshold within a predetermined period of time after setting or adjusting the fuel flow rate and/or airflow rate into the cylinders 14 at block 202.

A second operation similar to the operation conducted in block 202 may be conducted to determine if the air-fuel ratios of each cylinder 14 have deviated from the commanded air-fuel ratio. The process may be repeated at set time intervals to check the health of the cylinders 14 (i.e., to determine whether or not each of the cylinders 14 are operating at the commanded air-fuel ratio or are drifting away from operating at the commanded air-fuel ratio over time). The deviation may be the difference between a measured air-fuel ratio (which may be measured as the air-fuel equivalence ratio, $\lambda$, by the first lambda or oxygen sensor 62) and the commanded air-fuel ratio. Slight deviations in the air-fuel ratio from the commanded air-fuel ratio may be expected over time due to normal wear and may be adjusted by the feedback control discussed above. Large deviations in the air-fuel ratio from the commanded air-fuel ratio over a short period time, however, may be indicative of larger problems that require servicing the engine 12. For example, any deviation in the air-fuel equivalence ratio ($\lambda$) that exceeds a value of 0.01 within a specified monitored time period may be indicative of a larger problem that requires servicing the engine 12 (e.g., a damaged piston ring or damaged fuel injector).

Operations initially conducted according to block 202 after the engine 12 has been manufactured or after the engine 12 has been significantly overhauled or serviced (i.e., the first time or the first few times the engine 12 has been operated after being manufactured or after being significantly serviced) that result in a deviation of the air-fuel ratio, may be indicative of a specific component of the engine 12 being outside of a manufacturing tolerance (e.g., the fuel injector 50 is out of alignment, the orifice of the fuel injector that delivers fuel to the cylinder is slightly larger or smaller than a tolerable range, the piston rings have not yet conformed to the shape of the cylinders 14, etc.). If a correction in the air-fuel ratio is maintained for a specified time period after testing the engine 12 shortly after the engine 12 has been manufactured or significantly serviced, then the controller 54 may recognize that the operation of the cylinder 14 has been corrected, regardless if the deviation in the air-fuel ratio was small or large.

If a deviation of the air-fuel ratio of one of the cylinders 14 from the commanded air-fuel ratio does exceed the first threshold within the predetermined period of time after setting or adjusting the fuel flow rate and/or airflow rate into the cylinders 14 at block 202, the method 200 moves from block 204 on to block 206 where the controller 54 issues a notification that one or more of the cylinders 14 is defective or requires servicing. The notification may be generic and only indicate that there is a problem with the engine 12 or one or more of the cylinders 14. Alternatively, the notification may be specific and indicate which of the one or more cylinders 14 is defective or requires servicing. The notification may be audible (e.g., the notification may be issued through sound speakers within a cabin of the vehicle), visual (the notification may be the illumination of a warning light within the vehicle), haptic (e.g., vibration transmitted through the steering wheel, accelerator pedal, brake pedal, seat, etc.), or by any other source known in the art.

Returning to block 204, if a deviation of the air-fuel ratio of one of the cylinders 14 from the commanded air-fuel ratio does not exceed the first threshold within the predetermined period of time after setting or adjusting the fuel flow rate and/or airflow rate into the cylinders 14 at block 202, the method 200 moves on to block 208 where it is determined if a diagnostic test to check the functionality of a skip-fire mode has been initiated. More specifically, the diagnostic test is configured to determine whether or not the air intake valves 36 and/or the exhaust valves 48 of each cylinder 14 are shutting down (i.e., if the valves are deactivating and remaining closed) when the specific cylinder 14 is shut down or deactivated during a skip-fire mode. The diagnostic test may be performed at some predetermined interval or may be operated one or more times during each cycle that the engine 12 operated.

An air intake valve 36 and/or the exhaust valve 48 of a specific cylinder 14 may become stuck in an activated condition (i.e., where the valves are opening and closing), even if the controller 54 has commanded the specific cylinder 14 to become shut down or deactivated during a skip-fire mode, if the locking pin 86 of the mechanism 82 that deactivates the valves is unable to retract and disengage the deactivation arm 84. This may occur if the second chamber 100 becomes blocked with soot or some other material that prevents the pressurized oil from entering the second chamber to retract the locking pin to 86, a conduit from the second valve 104 to the second chamber becomes blocked, or if the second valve 104 fails to open. When the intake valve 36 and the exhaust valve 48 of a specific cylinder 14 become stuck in an activated condition the measured air-fuel ratio at the outlet of the engine 12 (which is measured in the form of the air-fuel equivalence ratio ($\lambda$) by the first lambda or oxygen sensor 62) may be skewed due to excess air entering the exhaust gas stream from the deactivated cylinder 14 through the still functioning intake valve 36 and exhaust valve 48 of the deactivated cylinder 14. The air simply passes through the cylinder 14 without combustion occurring because the fuel injector 50 and the spark 52 have been deactivated. The skewed measured air-fuel ratio may result in the controller erroneously adjusting the rate of fuel or air flow into the engine 12 to power the cylinders 14 that are still operating. The skewed measured air-fuel ratio may also result in erroneous emissions control.

If it is determined that diagnostic test to check the functionality of the skip-fire mode has not been initiated at block 208, the method 200 recycles back to the beginning of block 208. If it is determined that the diagnostic test to check the functionality of the skip-fire mode has been initiated at block 208, the method 200 moves on to block 210 where the diagnostic test is performed. At block 210, the engine 12 is operated such that each of the cylinders 14 is shut down or deactivated for a portion of the diagnostic test while one or more of the remainder of the cylinders 14 remain operating. The cylinders 14 may be shut down and restarted in any chronological order. Furthermore, each cylinder 14 may be shut down alone while all of the remainder of the cylinders 14 remain operating, or each cylinder may be shut down along with one or more of the other of the cylinders 14, with some of the remainder of the cylinders 14 remaining operating.

Once the diagnostic test is complete at block 210, the method 200 moves on to block 212 where it is determined if a deviation from the commanded air-fuel ratio exceeded a second threshold while a first of the cylinders 14 was shut down or deactivated during the diagnostic test at block 210. The deviation of the commanded air-fuel ratio exceeding the second threshold while the first of the cylinders 14 is shut down during the diagnostic test, may be indicative that at least one of the cylinders 14, including the first of the cylinders 14, has valves (i.e., the intake valve 36 and/or the exhaust valve 48) that are not shutting down if the particular cylinder 14 is shut down or deactivated during the skip-fire mode. Alternatively, the deviation of the commanded air-fuel ratio exceeding the second threshold while the first of the cylinders 14 is shut down during the diagnostic test at block 210, may be indicative that at least one of the cylinders 14, including the first of the cylinders 14, has valves (i.e., the intake valve 36 and/or the exhaust valve 48) that are not completely sealing when the valves are in the closed positions, that the fuel delivery system 18 or the fuel injectors 50 are not working correctly (e.g., the fuel delivery system 18 or the fuel injectors 50 are not delivering the requested amount of fuel to the cylinders 14), that wear of the cylinders 14 due to misalignment of the piston 24 or defective piston rings may be causing combustion to occur earlier or later than desired, that the air intake system 16 is not properly controlling the air flowing into the cylinder 14, or that another issue is causing an air-fuel ratio imbalance (i.e., a measured air-fuel ratio being different than the commanded air-fuel ratio). The deviation of the commanded air-fuel ratio not exceeding the second threshold while the each of cylinders 14 is shut down during the diagnostic test, including the first of the cylinders 14, is indicative that the valves (i.e., the intake valve 36 and/or the exhaust valve 48) of each cylinder 14 are shutting down if a particular cylinder 14 is shut down or deactivated during the skip-fire mode. The deviation from the commanded air-fuel ratio may be representative of a deviation that exceeds the tolerable range when the deviation is in excess of the second threshold.

If the deviation from the commanded air-fuel ratio did not exceed the second threshold while the each of cylinders 14 was shut down or deactivated during the diagnostic test at block 210, including the first of the cylinders 14, the method 200 moves on to block 214 where it is determined if a command has been issued by the controller 54 to transition the engine 12 into a skip-fire mode. If a command has not been issued to transition the engine 12 into the skip-fire mode, the method 200 recycles back to the beginning of block 214. If a command has been issued to transition the engine 12 into the skip-fire mode, the method 200 moves on to block 216 where one or more of the cylinders 14, which may include the first of the cylinders, are shut down or deactivated. The number of cylinders 14 that are shut down or deactivated may be based on obtaining a balance between increasing fuel economy while also maintaining any required power output that is requested by the vehicle operator.

Returning to block 212, if the deviation from the commanded air-fuel ratio did exceed the second threshold while the first of the cylinders 14 was shut down or deactivated during the diagnostic test at block 210, the method 200 moves on to block 218 where the controller issues a notification that the valves (i.e., the intake valve 36 and/or the exhaust valve 48) of at least one of the cylinders 14, including the first of the cylinders 14, are not deactivating or shutting down while the engine 12 is in the skip-fire mode. Alternatively, if the deviation from the commanded air-fuel ratio did exceed the second threshold while the first of the cylinders 14 was shut down or deactivated during the diagnostic test at block 210, the controller 54 may issue a notification at block 218 that is indicative that at least one of the cylinders 14, including the first of the cylinders 14, has valves (i.e., the intake valve 36 and/or the exhaust valve 48) that are not completely sealing when the valves are in the closed positions, that the fuel delivery system 18 or the fuel injectors 50 are not working correctly (e.g., the fuel delivery system 18 or the fuel injectors 50 are not delivering the requested amount of fuel to the cylinders 14), that wear of the cylinders 14 due to misalignment of the piston 24 or defective piston rings may be causing combustion to occur earlier or later than desired, that the air intake system 16 is not properly controlling the air flowing into the cylinder 14, or that another issue is causing an air-fuel ratio imbalance (i.e., a measured air-fuel ratio being different than the commanded air-fuel ratio). The notification may be generic and only indicate that the valves of at least one of the cylinders 14 are not deactivating or shutting down while the engine 12 is in the skip-fire mode. Alternatively, the notification may be specific and indicate which of the one or more cylinders 14 has valves that are not deactivating or shutting down while the engine 12 is in the skip-fire mode. The notification may be audible (e.g., the notification may be issued through sound speakers within a cabin of the vehicle), visual (the notification may be the illumination of a warning light within the vehicle), haptic (e.g., vibration transmitted through the steering wheel, accelerator pedal, brake pedal, seat, etc.), or by any other source known in the art.

The method 200 next moves on to block 220 where it is determined if a deviation from the commanded air-fuel ratio exceeded the second threshold while a second of the cylinders 14 was shut down or deactivated during the diagnostic test at block 210. The deviation of the commanded air-fuel ratio exceeding the second threshold while the second of the cylinders is shut down or deactivated during the diagnostic test, is indicative that two or more of the cylinders 14 have valves (i.e., the intake valve 36 and/or the exhaust valve 48) that are not shutting down during the skip-fire mode. The deviation of the commanded air-fuel ratio not exceeding the second threshold while the second of the cylinders is shut down or deactivated during the diagnostic test, is indicative that only the first of the cylinders 14 has valves (i.e., the intake valve 36 and/or the exhaust valve 48) that are not shutting down during the skip-fire mode. The deviation from the commanded air-fuel ratio may be representative of a deviation that exceeds the tolerable range when the deviation is in excess of the second threshold.

If the deviation from the commanded air-fuel ratio did not exceed the second threshold while the second of the cylinders 14 was shut down or deactivated during the diagnostic test at block 210, the method 200 moves on to block 222 where it is determined if a command has been issued by the controller 54 to transition the engine 12 into a skip-fire mode. If a command has not been issued to transition the engine 12 into the skip-fire mode, the method 200 recycles back to the beginning of block 222. If a command has been issued to transition the engine 12 into the skip-fire mode, the method moves on to block 224 where one or more of the cylinders 14, other than the first of the cylinders 14 (i.e., the cylinder determined to have valves that are not shutting down during the skip-fire mode at block 212), are shut down or deactivated. The number of cylinders 14 that are shut down may be based on obtaining a balance between increasing fuel economy while also maintaining any required power output that is requested by the vehicle operator.

Returning to block 220, if the deviation from the commanded air-fuel ratio did exceed the second threshold while the second of the cylinders 14 was shut down or deactivated during the diagnostic test at block 210, the method moves on to block 226, where it is determined if a command has been issued by the controller 54 to transition the engine 12 into a skip-fire mode. If a command has not been issued to transition the engine 12 into the skip-fire mode, the method 200 recycles back to the beginning of block 226. If a command has been issued to transition the engine 12 into the skip-fire mode, the method 200 moves on to block 228 where the controller overrides shutting down any of the cylinders 14 (i.e., the engine 14 is prevented from entering into the skip-fire mode). It should be understood that the flowchart depicted in FIGS. 4A and 4B is for illustrative purposes only and that the method 200 should not be construed as limited to the flowchart in FIGS. 4A and 4B. Some of the steps of the method 200 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a variable displacement engine having a plurality of cylinders and configured to operate at a commanded air-fuel ratio; and
a controller programmed to,
in response to a command to perform a diagnostic test, operate the variable displacement engine such that each of the cylinders is shut down for a portion of the diagnostic test while one or more of the remainder of the cylinders remain operating, and
in response to a deviation from the commanded air-fuel ratio exceeding a threshold while only a first of the cylinders is shut down during the diagnostic test and a command to decrease the number of operating cylinders and transition the variable displacement engine to a skip-fire mode during an operation of the variable displacement engine subsequent to the diagnostic test, transition the variable displacement engine to the skip-fire mode, shut down each of the plurality of cylinders other than the first of the cylinders at least once during the during skip-fire mode, and maintain operation of the first of cylinders during the skip-fire mode.

2. The vehicle of claim 1, wherein the controller is further programmed to, in response to the deviation from the commanded air-fuel ratio exceeding the threshold while the first of the cylinders is shut down during the diagnostic test, issue a notification that valves of at least one of the cylinders are not deactivating during a mode where one or more of the cylinders are shut down.

3. The vehicle of claim 1, wherein the controller is further programmed to, in response to the deviation from the commanded air-fuel ratio exceeding the threshold while the first of the cylinders is shut down during the diagnostic test, a second deviation from the commanded air-fuel ratio exceeding the threshold while a second of the cylinders is shut down during the diagnostic test, and the command to decrease the number of operating cylinders and transition the variable displacement engine to the skip-fire mode during the operation of the engine subsequent to the diagnostic test, override shutting down any of the plurality of cylinders.

4. The vehicle of claim 1, wherein the controller is further programmed to operate each of the cylinders individually prior to the diagnostic test and set a fuel flow to each cylinder such that each cylinder operates at the commanded air-fuel ratio.

5. The vehicle of claim 4, wherein the controller is further programmed to, in response to a deviation of an air-fuel ratio of one of the plurality of cylinders from the commanded air-fuel ratio exceeding the threshold within a predetermined period of time after setting the fuel flow to each of the cylinders, issue a notification that one of the cylinders is defective.

6. The vehicle of claim 1 further comprising an oxygen sensor that is configured to measure an oxygen content within exhaust gas produced by the variable displacement engine, and wherein the controller is configured to adjust the air-fuel ratio of the variable displacement engine to the commanded air-fuel ratio based on the measured oxygen content within the exhaust gas.

7. The vehicle of claim 6 further comprising an exhaust gas conduit that is configured to channel the exhaust gas from the plurality of cylinders to a catalyst, and wherein the oxygen sensor is disposed within the exhaust gas conduit between the plurality of cylinders and the catalyst.

8. A method of operating a vehicle engine having a plurality of cylinders comprising:
    operating the vehicle engine during a diagnostic test such that each of the cylinders is shut down for a portion of the diagnostic test while one or more of the remainder of the cylinders remain operating;
    detecting a deviation from a commanded air-fuel ratio exceeding a threshold while only a first of the cylinders is shut down during the diagnostic test;
    commanding the vehicle engine to decrease the number of operating cylinders and transition the vehicle engine to a skip-fire mode during an operation of the vehicle engine subsequent to the diagnostic test;
    transitioning the vehicle engine to the skip-fire mode subsequent to detecting the deviation and subsequent to the command to decrease the number of operating cylinders;
    shutting down each of the plurality of cylinders other than the first of the cylinders at least once during the skip-fire mode; and
    maintaining operation of the first of cylinders during the skip-fire mode.

9. The method of claim 8 further comprising:
    issuing a notification that valves of at least one of the cylinders are not deactivating during a mode where one or more of the cylinders are shut down subsequent to the diagnostic test.

10. The method of claim 8 further comprising:
    operating the vehicle engine during a second diagnostic test such that each of the cylinders is shut down for a portion of the second diagnostic test while one or more of the remainder of the cylinders remain operating subsequent to shutting down one or more of the plurality of cylinders other than the first of the cylinders,
    detecting a second deviation from the commanded air-fuel ratio exceeding the threshold while a second of the cylinders is shut down during the second diagnostic test,
    commanding the vehicle engine to decrease the number of operating cylinders and transition the vehicle engine to the skip-fire mode during a second operation of the vehicle engine subsequent to the second diagnostic test, and
    overriding shutting down any of the plurality of cylinders, subsequent to detecting the second deviation and subsequent to the second command.

11. The method of claim 8 further comprising:
    operating each of the cylinders individually prior to the diagnostic test and determining a measured air-fuel ratio of each cylinder.

12. The method of claim 11 further comprising:
    adjusting a fuel flow to each cylinder such that each cylinder operates at the commanded air-fuel ratio.

13. The method of claim 12 further comprising:
    detecting a deviation of an air-fuel ratio of one of the plurality of cylinders from the commanded air-fuel ratio exceeding the threshold within a predetermined period of time after adjusting the fuel flow to each of the cylinders, and issuing a notification that one of the cylinders is defective.

14. A vehicle comprising:
    an engine having plurality cylinders and configured to operate at a commanded air-fuel ratio; and
    a controller programmed to,
        in response to a command to perform a diagnostic test, operate the engine such that each of the cylinders is shut down for a portion of the diagnostic test while one or more of the remainder of the cylinders remain operating, and
        in response to a deviation from the commanded air-fuel ratio exceeding a threshold while only a first of the cylinders is shut down during the diagnostic test and a command to transition the engine to a skip-fire mode during an operation of the engine subsequent to the diagnostic test, transition the engine to the skip-fire mode, shut down each of the plurality of cylinders other than the first of the cylinders at least once during the skip-fire mode, and maintain operation of the first of cylinders during the skip-fire mode.

15. The vehicle of claim 14, wherein the controller is further programmed to, in response to the deviation from the commanded air-fuel ratio exceeding the threshold while the first of the cylinders is shut down during the diagnostic test, issue a notification that valves of at least one of the cylinders are not deactivating during the skip-fire mode.

16. The vehicle of claim 14, wherein the controller is further programmed to, in response to the deviation from the commanded air-fuel ratio exceeding the threshold while the first of the cylinders is shut down during the diagnostic test, a second deviation from the commanded air-fuel ratio exceeding the threshold while a second of the cylinders is shut down during the diagnostic test, and the command to transition the engine to the skip-fire mode during the operation of the engine subsequent to the diagnostic test, override operating in the skip-fire mode.

17. The vehicle of claim 14, wherein the controller is further programmed to operate each of the cylinders individually prior to the diagnostic test and set a fuel flow to each cylinder such that each cylinder operates at the commanded air-fuel ratio.

18. The vehicle of claim 17, wherein the controller is further programmed to, in response to a deviation of an air-fuel ratio of one of the plurality of cylinders from the commanded air-fuel ratio exceeding the threshold within a predetermined period of time after setting the fuel flow to each of the cylinders, issue a notification that one of the cylinders is defective.

19. The vehicle of claim 14 further comprising an oxygen sensor that is configured to measure an oxygen content within exhaust gas produced by the engine, and wherein the controller is configured to adjust the air-fuel ratio of the engine to the commanded air-fuel ratio based on the measured oxygen content within the exhaust gas.

20. The vehicle of claim 19 further comprising an exhaust gas conduit that is configured to channel exhaust gas from the plurality of cylinders to a catalyst, and wherein the oxygen sensor is disposed within the conduit between the plurality of cylinders and the catalyst.

* * * * *